May 27, 1969          C. G. KELSEY          3,446,116

MODEL TO DIE REVERSAL MEANS AND METHOD

Filed Oct. 31, 1966          Sheet __1__ of 2

CHRISTOPHER G. KELSEY
INVENTOR

BY Seed & Berry

ATTORNEYS

May 27, 1969  C. G. KELSEY  3,446,116
MODEL TO DIE REVERSAL MEANS AND METHOD
Filed Oct. 31, 1966  Sheet 2 of 2

CHRISTOPHER G. KELSEY
INVENTOR

BY

ATTORNEYS

United States Patent Office 3,446,116
Patented May 27, 1969

3,446,116
MODEL TO DIE REVERSAL MEANS AND METHOD
Christopher G. Kelsey, Glenalta, South Australia, Australia, assignor to Data Resolved Tools Pty. Ltd., Plympton, South Australia, Australia
Filed Oct. 31, 1966, Ser. No. 590,632
Int. Cl. B23c *1/16, 1/18*
U.S. Cl. 90—13.5                                           8 Claims

ABSTRACT OF THE DISCLOSURE

A model to die reversal machine capable of cutting right and left hand dies from either a right or left hand model, the machine having a machine tool with a cutting head and work table relatively movable in $x$, $y$ and $z$ directions independently, a tracer having a tracing head and model table relatively movable in $x$, $y$ and $z$ directions independently, coupling means coupling relative respective movements of the cutting head and work table of the machine tool and a tracing head and model table of the tracer, and direction reversing means in at least one of the coupling means.

---

Figure 1:
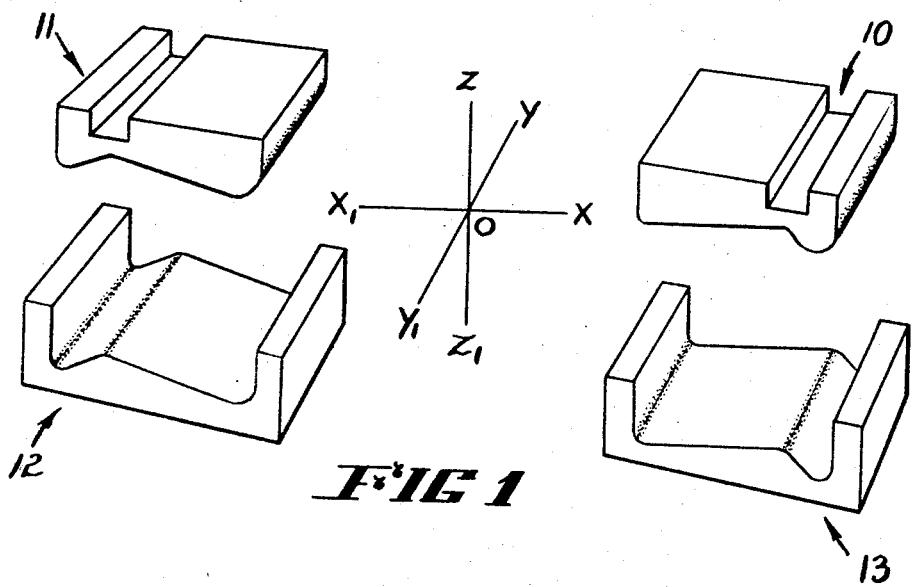

This invention relates to means and method for reversal of shape from a model to a die.

In the field of die making die sinking is frequently achieved by passing a tracer over a model and reproducing the traced shape with a cutting tool which simultaneously passes over a metal die member. When tape control machines are used instead of model following machines reversal of shape to right and left hand is relatively simple, but heretofore it has been a practice to make both right and left hand models for right and left hand dies. Thus for example in the case of an automobile door panel, it has been customary to make right and left hand master models, right and left hand tooling models from the master models and then right and left hand secondary tooling models. The secondary tooling models are used for building up shape to suit die conditions to incorporate overdraw, ring lines and the like, the first tooling model being used as a replica of the master model for general die work, the master model being retained for final checking purposes.

The main object of this invention is to provide a simple and effective means and method of production of tools which will eliminate the need to make all models in both right and left hand. It should be understood however that in many cases it is desirable to have both right and left hand models, particularly in the case of the master models which are used for final checking purposes, since checking through any measuring or data transmission system can be more tedious than direct checking to a model.

Throughout the specification use will be made of the standard terminology of solid geometry, that is, a point in space will be defined with reference to $x$, $y$ and $z$ coordinates and a left-hand male tool will be considered to be a tool wherein a point in space is $-x$, $y$, $z$ while the right-hand male tool will have a corresponding point in space $x$, $y$, $z$; the left-hand female having points in space defined as $-x$, $y$, $-z$ and the right-hand female as $x$, $y$, $-z$. It may be noted that at least one but not more than two displacements involve change of sign. (In this example "$y$" is always positive.)

The invention may include as a feature means to interrelate a mounting base and a cutter of the one part and a second mounting base and tracer of the other part and to interconnect the tracer and cutter so that $y$ and $z$ movements are identical but the $x$ movement of the cutter may be reversed to correspond to a $-x$ movement of the tracer.

According to one of its simple forms the invention may be defined as consisting of a machine tool having a cutting head and a work table, guide engaging means and guides on the machine tool guiding the cutting head and work table for relative independent movement in $x$, $y$ and $z$ directions, a tracer having a tracing head and a model table, guide engaging means and guides on the tracer guiding the tracing head and model table for relative independent movement in $x$, $y$ and $z$ directions, coupling means coupling said relative respective movements of the cutting head and work table of the machine tool and the tracing head and model table of the tracer, and direction reversing means in at least one of the coupling means.

The invention may be carried out either mechanically or electrically, and embodiments of each of these types are described hereunder to illustrate the invention in some detail, the mechanical embodiment being somewhat diagrammatic to illustrate the reversal of motion.

Figure 2:
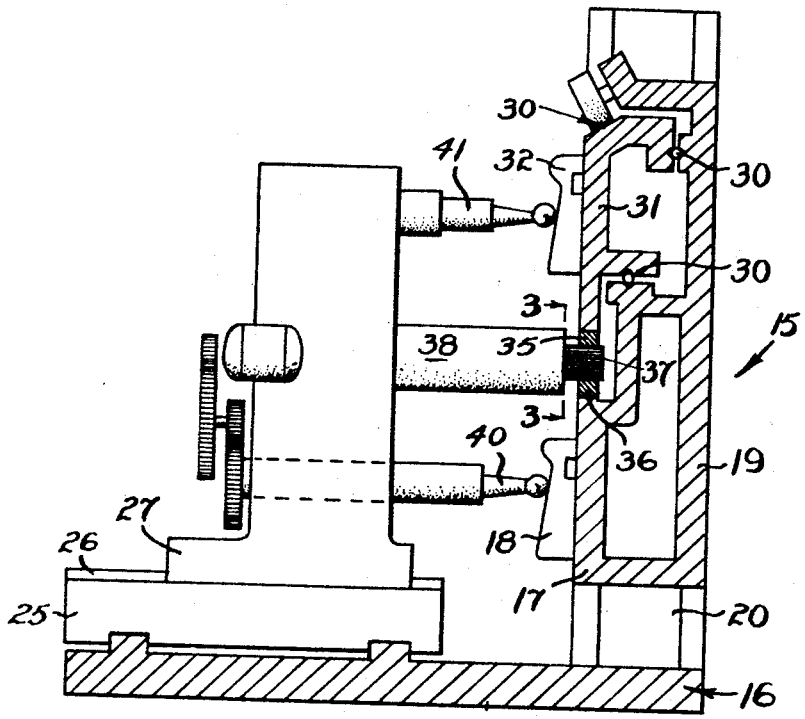
Figure 3:
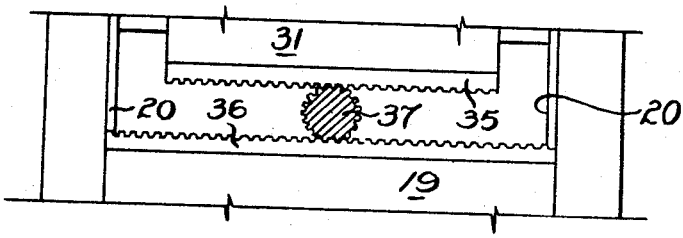
Figure 4:
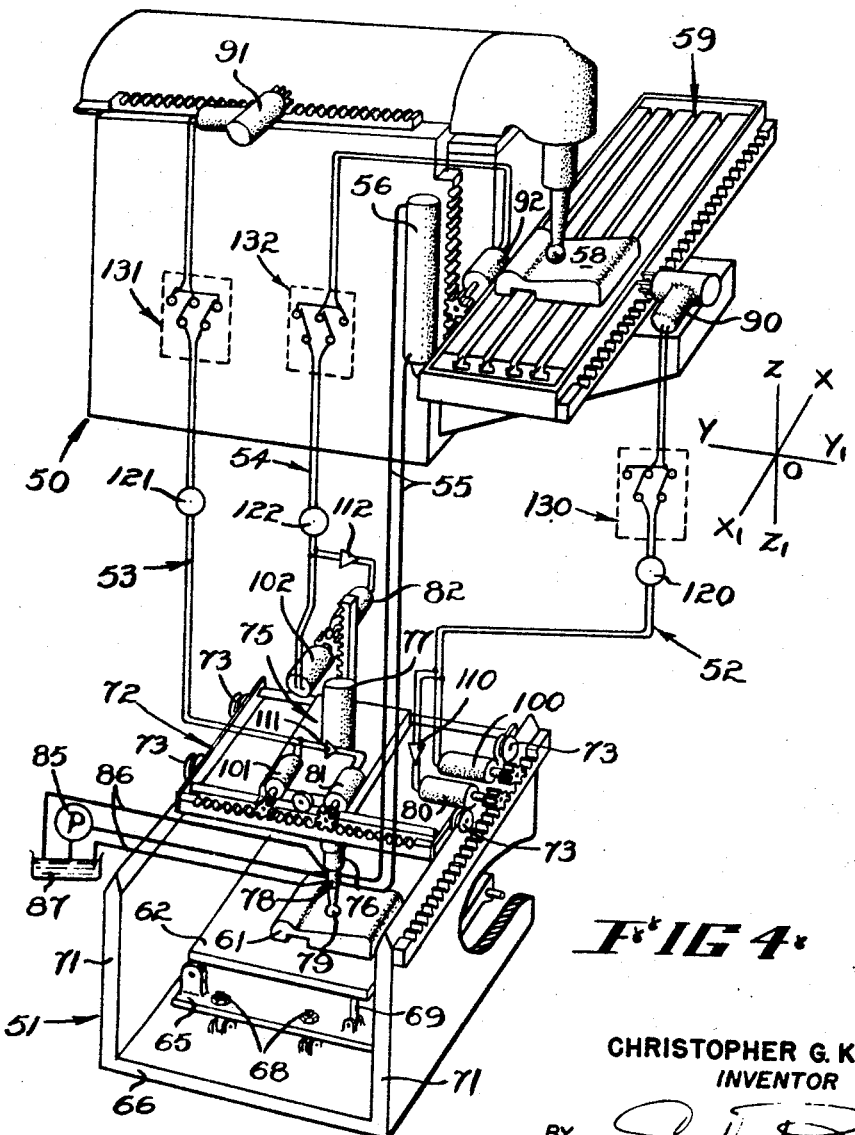

In the drawings with reference to which the embodiments are described:

FIG 1 illustrates male and female, right and left hand dies with repsect to a set of Cartesian co-ordinates, FIG. 2 is a somewhat diagrammatic representation of a machine tool wherein movement in the $x$ direction is reversed, FIG. 3 is a fragmentary section on line 3—3 of FIG. 2, and FIG. 4 illustrates a practical electrical embodiment of the invention.

Referring first to FIG. 1, a set of dies is designated as follows in relation to Cartesian co-ordinates:

10  Right-hand male $+x$; $+y$; $+z$
11  Left-hand male $-x$; $+y$; $+z$
12  Left-hand female $-x$; $+y$; $-z$
13  Right-hand female $+x$; $+y$; $-z$ According to the first embodiment of FIGS. 2 and 3, a die sinking machine 15 is provided with a base 16 having platen means 17 constituting a work table suitable for receiving for example a cast iron die member 18 to be cut to shape, the platen means 17 being on a vertically movable saddle 19 guided by guides 20 on the base 16. In this embodiment the base is further provided with a primary saddle 25 which allows movement in the $x$ direction, the primary saddle 25 having on its guides 26 which carry a second saddle 27 guided thereby for movement in the $y$ direction. The vertically movable saddle 19 has a further set of slides or guideways (designated 30) extending in the $x$ direction parallel to but displaced from the primary saddle guides. A vertical model table 31 carries a model 32 and is guided for movement in the $x$ direction by guideways 30 and is interconnected with the vertically movable saddle 19 through a pair of racks engaging a pinion. One of the racks designated 35 is secured to the model table 31 and extends in an $x$ direction, the second rack 36 is secured to the saddle 19 and extends in the $x$ direction while the pinion 37 is journalled in bearings 38 on the second saddle 27 and has its axis extending in the $y$ direction.

The second saddle 27 provides movement of the $z$ direction for a cutter 40 and also carries the bearings for a tracer 41 so that any $z$ component of movement by the cutter and the tracer is simultaneous. Similarly, any $x$ and $y$ movement of the cutter and tracer are simultaneous. In this respect the die sinker does not depart from standard practice. However any $x$ movement of the die sinker vertically movable saddle 19 will result in a $2x$ movement of the table 31 (FIG. 3). In other words the relationship between the tracer and a model when secured to the model table is $-x$ for $x$ movement between the cutter and the iron die member, Thus the cutter will cut the mirror image of the model shape. This device however will not produce female from male opposite hand.

In practice the invention will desirably be exercised electrically, and according to the second embodiment of FIG. 4 a machine tool 50 is coupled to a tracer 51 by three servo loops 52 ($x$ movement), 53 ($y$ movement) and 54 ($z$ movement), and hydraulic lines 55 ($z$ movement). The machine tool 50 is a standard vertical mill having a hydraulic cylinder 56 for effecting vertical movement.

To facilitate cutting of a die 58 when secured to the work table 59 of the machine tool 50 in a tilted direction relative to a model 61 when mounted on the model table 62 of the tracer 51, the invention includes a primary tilting table 65 which tilts relative to the base 66 of the tracer 51 about a $y$ axis and the model table 62 is a secondary tilt table which tilts relative to the primary tilt table about what may then be regarded as an $x$ axis (assuming that the primary tilt table is in its untilted position as shown in FIG. 4). Tilting is controlled by screw threaded members 68 and 69 respectively and the tilt tables can be locked in any desired angle within the range determined by the physical characteristics of the base and the two tables.

The base 66 has on it a pair of parallel upstanding runways 71 or guideways extending in the $x$ direction and a carriage 72 is freely movable along these runways or guideways, the carriage 72 being supported by wheels 73 on the upper edges of the guideways 71. A sub-carriage 75 is movable along the first said carriage 72 in a $y$ direction and carries on it a tracer head 76 which is movable in a $z$ direction, the tracer being guided for movement by an elongated bearing 77. The lower end of the tracer head 76 carries on it a sensitive hydraulic spool valve 78 and a feeler member 79 having a ball end of radius similar to that of the cutter, or smaller by panel thickness for a male die.

Movement of the tracer in the $x$, $y$ and $z$ directions is controlled by respective servo motors 80, 81 and 82, one for each direction. Deflection of the tracer passing over the model in turn operates a transducer wherein the power control is constituted by the hydraulic valve 78 which is of the type commonly used on die sinking machines, and is provided with alternative outlets connected to the lines 55 which are arranged to provide nearly constant feed rate regardless of $x$–$y$–$z$ changes. A pump 85 supplies pressure oil to the valve 78, and exhaust lines 86 conduct exhaust oil back to a reservoir 87. Deflection of the feeler member opens the valve 78 in a forward direction and closes it in a reverse direction (or vice versa) and pressure oil is transmitted to the feed control cylinder 56 on the machine tool.

This embodiment reverses the usual concept of servo-loops wherein the tracer operates a master device and the machine tool a slave device, and according to this embodiment three synchros 90 ($x$ movement), 91 ($y$ movement) and 92 ($z$ movement) form portion of respective synchro loops 52, 53 and 54. These synchros are master synchros and are responsive to relative movement between the cutting head and work table of the machine tool 50. Corresponding respectively matched synchros 100, 101 and 102 are arranged on the tracer 51 to be responsive to relative movement between the feeler member 79 and the model table 62. Error signals are amplified through respective amplifiers 110, 111 and 112 and drive respective motors 80, 81 and 82 to effect corrective movement of the feeler, which continues until errors disappear. In all cases the translation of movement between synchros and servo motors and respective members movable in $x$. $y$ and $z$ directions is through accurately cut racks and pinions. Since very little effort is required to move the tracer head (as compared with the machine tool) the mechanism can be simple, of low cost and low power.

Respective off-set zero differential synchros 120, 121 and 122 are interposed in loops 52, 53 and 54, and by simply adjusting these correct relative positions of model and work can be attained even if the original mechanical positioning is incorrect.

Respective reversing switches 130, 131 and 132 interposed in the loops 52, 53 and 54 provide means for reversing $x$, $y$ and $z$ direction movements between model and workpiece thus providing simple means for achieving right/left hand male/female workpieces from a single model. This invention therefore greatly simplifies the present concept of a die sinking machine and is applicable to, for example, a standard milling machine. An operator merely needs to operate the milling machine in the normal way, indexing between cuts in the $x$ or $y$ direction, setting the desired feed for each cut in the $y$ or $x$ direction respectively, and allowing the servo-loop to control movement in the $z$ direction.

If desired the electrical interconnection may be varied in any one of a number of ways making use of other known feedback systems, or if desired the $y$ and/or $x$ movement can be achieved by direct coupling the tracer and the secondary carriage to the corresponding elements of the machine tool and utilizing an on/off switch controlled by movement in the $y$ and/or $x$ direction. $z$ direction movement of the tracer can again be mechanically coupled if desired through some reversing device (say for example a perforated band or a double rack and pinion device) or alternatively movement in the $z$ direction can be through a servo motor circuit as described above.

In the alternative use may be of simple synchronous motors to obtain identical rates of feed for movement in the $x$ direction of the cutter and in the $-x$ direction of the tracer.

What I claim is:
1. Model to die reversal means comprising:
   a machine tool having a cutting head and a work table, guide engaging means and guides on the machine tool guiding the cutting head and work table for relative movement in $x$, $y$ and $z$ directions independently,
   a tracer having a tracing head and a model table, guide engaging means and guides on the tracer guiding the tracing head and model table for relative movement in $x$, $y$ and $z$ directions independently,
   coupling means coupling said relative respective movements of the cutting head and work table of the machine tool and the tracing head and model table of the tracer, and
   direction reversing means in at least one of the coupling means.

2. Model to die reversal means according to claim 1 wherein said coupling means comprise servo-loops.

3. Model to die reversal means according to claim 2 wherein a reversing switch in a servo-loop constitutes said direction reversing means.

4. Model to die reversal means according to claim 3 wherein each servo-loop comprises a master synchro on the machine tool, a synchro on the tracer matched with the master synchro, an amplifier electrically coupled to the synchros and arranged to amplify error signals between the synchros, a slave servo motor on the tracer, mechanical drive means coupling the slave servo motor for drive to the tracer head, and an electrical interconnection between the servo motor and amplifier arranged to drive the servo motor by said amplified error signals in a direction to diminish the magnitude of error signal.

5. Model to die reversal means comprising:
   a machine tool having a frame, a cutting head and a work table, guide engaging means and guides on the machine tool guiding the cutting tool and work table for relative movement in $x$, $y$ and $z$ directions independently, a tracer having a tracing head and a model table, guide engaging means and guides on the tracer guiding the tarcing head and model table for relative movement $x$, $y$ and $z$ directions independently, three servo loops coupling relative movements in respective said $x$, $y$ and $z$ directions of the machine tool cutting head and work table and the tracing head and model table, each servo loop including a first synchro responsive to relative movement between the cutting head and work table, a second synchro responsive to relative movement between the tracing head and model table, an amplifier and a servo motor, mechanical drive means coupling the servo motor to the model table for drive of said relative movement between the tracing head and model table, an electrical connection between the amplifier and synchros arranged for the amplifier to amplify error signals between the synchros, and an electrical connection between the amplifier output and the servo motor making the servo motor responsive to said amplified error signal and driving the servo motor in a direction to reduce the error signal, and transducer means comprising operated means coupled to the machine tool to effect one of said movements in the $x$, $y$ or $z$ direction, and power control means on the tracing head controlling movement of the power operated means.

6. Model to die reversal means according to claim 5 wherein the power operated means is constituted by a hydraulic ram operatively connecting the frame and work table of the machine tool for said relative movement in the $z$ direction and the power control means is constituted by a hydraulic valve on the tracing head which changes position upon engagement of the sensing head with a model when secured to the model table.

7. Model to die reversal means according to claim 5 further comprising differential synchros in respective servo-loops, the differential synchros constituting off-set zeros.

8. The method of contouring a die from a shape determined by a model including the steps: securing a die workpiece to the work table on a machine tool having a cutter head and a work table and guide engaging means and guides guiding the cutter head and work table for relative movement in $x$, $y$ and $z$ directions independently, securing a model to a model table on a tracer, the tracer having a tracing head and guide engaging means and guides guiding the tracing head and model table for relative movement in the $x$, $y$ and $z$ directions independently, traversing the machine tool cutter head over the workpiece thereby driving the sensing head over the model, and reversing movement in coupling means coupling said respective movements of the cutting head and work table of the machine tool and the tracing head and model table of the tracer, said reversing movement being in at least one but not more than two of the said $x$, $y$ or $z$ directions of the cutter head over the workpiece for respective movement of the tracer over the model.

References Cited

UNITED STATES PATENTS

| | | | |
|---|---|---|---|
| 2,831,405 | 4/1958 | Sallwey et al. | 90—13.1 |
| 3,037,760 | 6/1962 | Arnault | 90—13.5 |
| 3,257,907 | 6/1966 | Maillet | 90—13.1 |

GERALD A. DOST, *Primary Examiner.*